Sept. 21, 1965  L. L. LECHENE  3,207,556

METHOD OF ASSEMBLING BRISTLES FOR COMMERCIAL BROOMS

Filed Oct. 2, 1964

INVENTOR
LEO L. LECHENE

BY Cullen, Sloman & Cantor
ATTORNEYS

United States Patent Office 3,207,556
Patented Sept. 21, 1965

3,207,556
METHOD OF ASSEMBLING BRISTLES FOR
COMMERCIAL BROOMS
Leo L. Lechene, R.D. 1, Box 364, Patton, Pa.
Filed Oct. 2, 1964, Ser. No. 401,042
5 Claims. (Cl. 300—21)

The present invention pertains to the making of power driven brooms such as used for sweeping of pavements. The broom normally includes a cylindrical core adapted for rotation about a longitudinal axis and a spiral groove in its exterior surface which extends between opposite ends of the core. The groove is adapted to receive and support the bristles which are formed into hairpin shape and retained by wire tightly wound over the apices of the bristles inserted in and following the spiral groove.

Heretofore, brushes of this type have been assembled by applying to such spiral groove under a securing wire individual strands of bristles formed into substantial V shape. There was difficulty, however, in properly feeding and assembling the bristles into the groove as the core rotated with respect to the securing wire.

The object of the present invention is to provide a novel bristle assembly and method of prefabrication to provide bristile assemblies formed into mats.

Other objects will be seen from the following specification and claims in conjunction with the appended drawing in which:

It will be understood that the above drawing illustrates merely one form of apparatus employed in the present method and article of manufacture.

Figure 1:
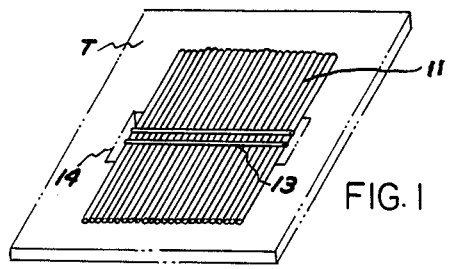
FIG. 1 is a perspective view of a plurality of thermoplastic bristles applied to a supporting surface with transverse reenforcing strips thereon.

Referring to the drawing, FIG. 1, and as a first step in the manufacturing process, a plurality of elongated thermoplastic bristles 11 are arranged in side by side parallel engaging relation upon flat supporting surface T in the form of a band or mat.

As a second step there is applied to and over said bristles centrally and transversely thereof, a pair of elongated reenforcing strips 13.

The bristles may be constructed initially of any suitable plastic or thermoplastic material such as polystyrene, as herein for illustration, polystyrene-acrylonitrile, polyvinyl chloride, polyvinylidene chloride, polyethylene, polypropylene or any other suitable material of polymer filament, including type 6, type 11, type 66, and type 610 nylon.

The reenforcing strips may be of any suitable material as for example cotton as nylon thread, on cord or equivalent material which will serve a reenforcing function.

Figure 3:
FIG. 3 illustrates schematically one form of apparatus for applying heat and pressure to the central transverse area of the registering bristles for bonding the same together and for embedding the reenforcing strips therein.

The support T has a central aperture 14 for the application of the bottom supporting platen or press 15, FIG. 3. Said platen has a suitable heat source, such as electric resistance coil 16 imbedded therein and also within the top heat and pressure platen 17.

Step three: Heat is applied to bristles 11 and reenforcing strips 13 along a narrow central area 18, FIG. 2. This area includes strips 13 and extends longitudinally thereof. Simultaneously sufficient compressive force is applied by platens 15 and 17, FIG. 3, which, with the application of heat fuses the central area 18 and embeds the reenforcing strips 13 down into and within the body of the bristles. At the same time the bristles are fused to each other along this central area 18. This forms a band 12 or first layer of bristles shown in FIG. 2 and 3.

Figure 2:
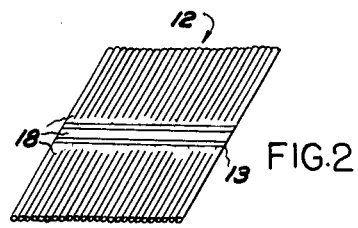
FIG. 2 is a perspective view of a band of bristles formed by the apparatus in FIG. 3.

Step four: As a further step band 12 of FIGS. 2 and 3 is formed into general V shape with its apex longitudinally and centrally of area 18 to provide a completed first layer 21 of bristles, using heated and formed platens 19 and 20, FIG. 4.

Figure 4:
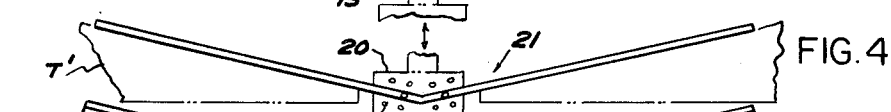
FIG. 4 is a similar view by which the bristle bands are simultaneously formed into a general V shape to form the first layer of bristles.

As an alternative, the apparatus in FIG. 3 may be replaced by the apparatus in FIG. 4 so that the formation of band 12 into V shape may be done simultaneously with the embedding and fusing operation above described.

With various types of material the amount of heat to be applied will vary depending upon the needed heat ranges which would cause fusion together at area 18 of the central portions of the individual bristles 11. For illustration using polypropylene bristles fusion has been accomplished with a heat range between 300 and 340° F. Fusion may be accomplished by providing heat in other ways as for example by a supersonic intsrument which creates high frequency. This excites the molecular structure for developing heat within a given area for fusing the band to the assembly shown in FIGS. 2, 3 and 4.

Figure 8:
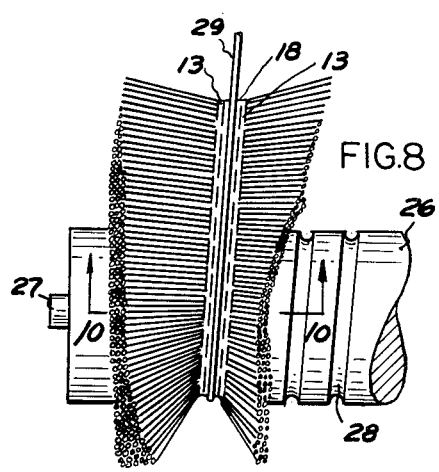
FIG. 8 is a fragmentary front elevational view showing the mounting of the assembled layers of bristles in band form upon the supporting core.

Such first layer 21 as finished in FIG. 4 could be applied to the spiral groove 28 of broom core 26, FIG. 8 which has a central supporting axis of rotation 27. The securing wire 29 anchors each bristle band as its apex within and along groove 28 throughout the length of core 26 as said core is rotated and layers 21 successively applied.

Figure 9:
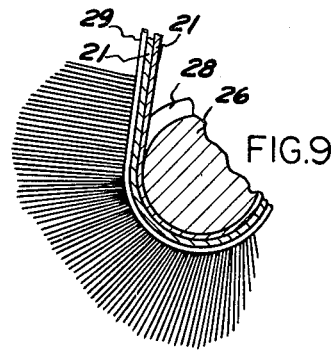
FIG. 9 is a broken away transverse sectional view thereof.
Figure 10:
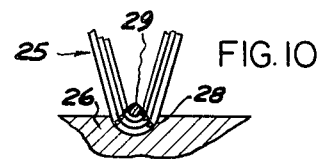
FIG. 10 is a fragmentary section taken on line 10—10 of FIG. 8.

In a preferred form of the present method, at least a pair of layers of bristles are employed, FIG. 9, or three layers of bristles as in FIGS. 8 and 10.

Figure 5:
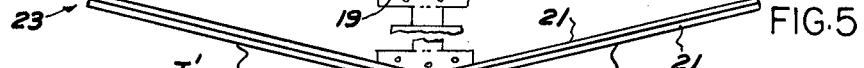
FIG. 5 is a similar view of the same apparatus for bonding together first and second layers of bristles.

Step five: A further step in the present process is to form a second layer of bristles in the form indicated at 21, FIG. 4 using the same steps above outlined. Then the second layer of bristles is superimposed over the first layer FIG. 5 with their apices in registry. Heat is then applied to both layers 21 by platens 19 and 20 at their central areas 18. This results in a fusing of said central areas together as at 22. Such assembly 23 may be used in the formation of a broom upon core 26 as in FIG. 9.

Figure 6:
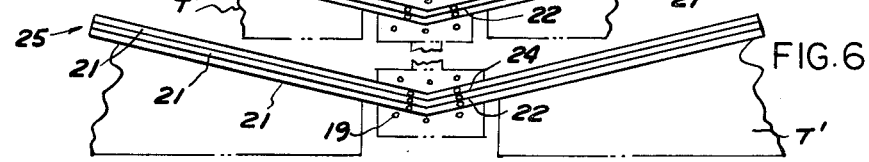
FIG. 6 is a similar view of the same apparatus for bonding a third layer to the bonded first and second layers of FIG. 5.

Step Six: In the present method applicant provides as a further step a third layer of bristles, FIGS. 6, 8 and 10. This is formed the same as the first layer FIGS. 3 or 4. This third layer 21 is similarly superimposed, FIG. 6, over the fused-together first and second layers, between heated platens 19 and 20. Thus said third layer 21 or top layer FIG. 6 is throughout its central area 18 intimately bonded and fused as at 24 to the top surface of the second layer. This provides the assembly 25 which when cooled and removed from platens 19 and 20 may be applied, as in FIGS. 8 and 10 to the spiral groove 28 of core 26. Wire 29 is tightly wound over and along spiral groove 28 and over the apices of the overlapped and bonded together first, second and third bristle layers.

After each individual bristle layer 21 is formed, it is normally permitted to solidify at atmospheric temperature. Solidification and curing may be achieved by using a liquid coolant if desired.

The drawing shows a preferred means by which heat and pressure can be applied to form the individual layers 21. Such layers are formed first as shown in FIGS. 3 or 4. Thereafter, layer 1 and layer 2 are bonded together at 22, FIG. 5. Thereafter the bonded together layers 1 and 2 are bonded at 24 to a third layer, FIG. 6.

Heretofore, when a bristle band was applied, absent then reenforcing strips 13, it was first bent to a V shape, FIG. 8, for registry within the spiral groove 28. Additional transverse stresses were applied to the assembly when it was formed to conform with the spiral groove, being bent transversely in a second direction. Oftentimes this resulted in such stresses upon the assembled bristles as would normally destroy the bond between them at their central areas 18.

Therefore, the important function of the embedded reenforcing strips 13 is to resist the additional transverse stresses resulting from the bending in the second right angular related direction.

Figure 7:
FIG. 7 shows a plurality of different cross-sectional shapes for the bristles.

Regardless of the cross-sectional shape of the bristles, FIG. 7, it is important in the forming step to provide the central fused apex area 18 with its wall portions flat so as to conform, as shown in FIGS. 8, 9 and 10, with the walls defining groove 28, down into which the apices of the bristle layers are positioned and held by securing wire 29.

The flat forming of such central portion is designed to prevent any slippage of the apex portions relative to the securing wire.

Having described my invention, reference shall now be had to the following claims.

I claim:
1. The method of assembling bristles for application to the grooved core of a broom comprising;
arranging in a single layer a plurality of elongated thermoplastic bristles in side by side parallel engaging relation upon a flat surface in the form of a band;
applying to and over said bristles an elongated reinforcing strip centrally and transversely thereof;
applying heat to the bristles along a narrow, central area including said strip longitudinally thereof, and simultaneously applying a compressive pressure to said area embedding said strip within the bristles and fusing the bristles to each other along said area;
and the further step of forming said band into general V-shape with the apex longitudinally and centrally of said area to provide a first layer of bristles.

2. In the method of claim 1, the further step of forming a second layer of bristles the same as the first layer; superimposing the second layer of bristles over the first layer with the apices in registry;
and applying heat to said layers through their central areas fusing said central areas together.

3. In the method of claim 1, the further step of forming a second layer of bristles the same as the first layer;
superimposing the second layer of bristles over the first layer with the apices in registry;
applying heat to said layers through their central areas fusing said central areas together;
forming a third layer of bristles the same as the first layer;
similarly superimposing the third layer of bristles over the fused-together first and second layers;
an applying heat to said layers at their central areas fusing the central area of the third layer to the central area of the second layer.

4. The method of claim 1, the forming step occurring simultaneously with the preceding fusing and embedding steps.

5. The method of assembling bristles for application to the spirally grooved core of a broom comprising:
arranging in a single layer a plurality of elongated thermoplastic bristles in side by side parallel engaging relation upon a flat surface in the form of a band,
applying to and over said bristles a pair of parallel spaced reinforcing strips of cotton or nylon cord centrally and transversely thereof,
applying heat in the range of 300–350° F. approximately to the bristles along a central narrow area including said strips and longitudinally thereof, and simultaneously applying a compressive pressure to said area embedding said strips within the bristles and fusing the bristles to each other along said areas;
and the further step forming said band into a V-shape with the apex longitudinally and centrally of said area to provide a first layer of bristles.

References Cited by the Examiner
UNITED STATES PATENTS
2,980,467  4/61  Lechne _____ 300—21

GRANVILLE Y. CUSTER, Jr., *Primary Examiner.*